Figure 3:
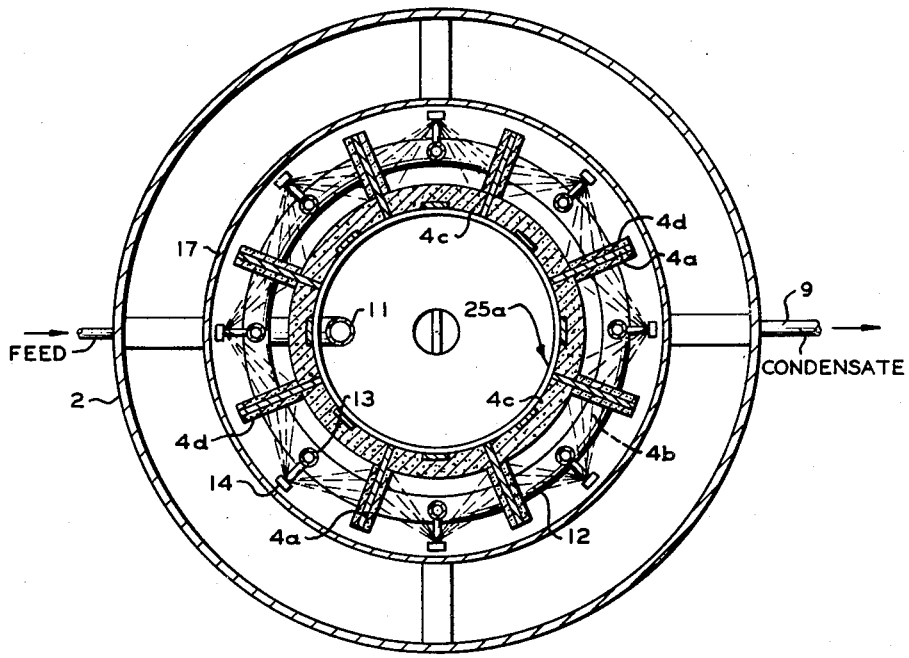

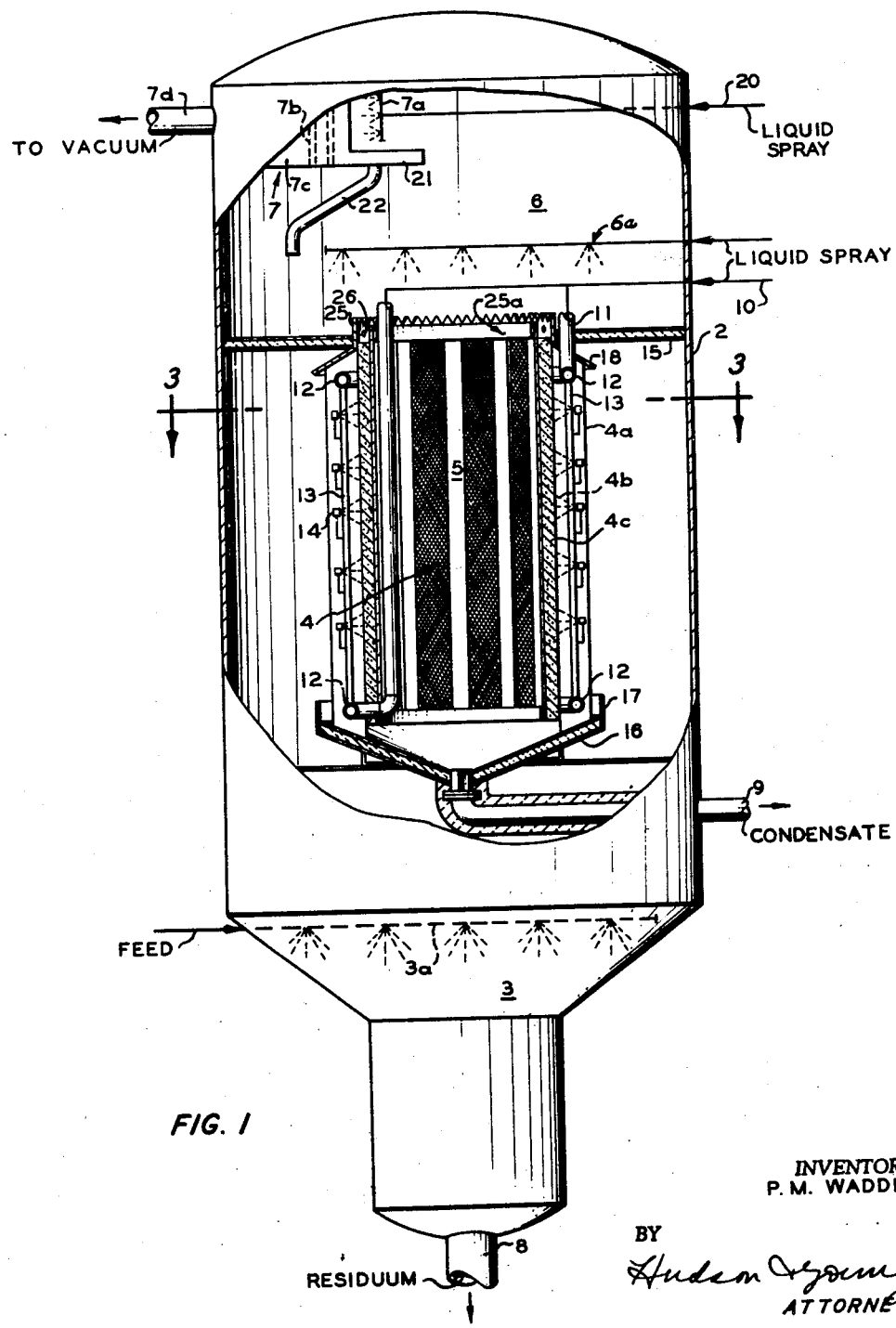
FIG. I

United States Patent Office 2,956,934
Patented Oct. 18, 1960

2,956,934

DISTILLATION

Paul M. Waddill, Bartlesville, Okla., assignor to Phillips Petroleum Company, a corporation of Delaware Filed Jan. 28, 1958, Ser. No. 711,596

14 Claims. (Cl. 202—187)

This invention relates to distillation. In one of its aspects, the invention provides an apparatus comprising a vertically disposable elongated distillation vessel especially adapted for vacuum flashing, said vessel having means for flash vaporizing a feed in the bottom thereof, residue draw-off means also in the bottom thereof, an elongated condensing section disposed substantially axially in a mid-section of said vessel forming an annulus in said mid-section through which annulus vapors formed in the bottom of the vessel can pass into said condensing section, means defining and closing the top of said annulus, a condensing demister section within said condensing section and substantially coextensive therewith, a condensate drop-out section axially provided within said condensing demister section and a condensate collecting means for collecting and removing condensate from said condensing, condensing-demister and condensate drop-out sections as distillate, said collecting means defining the bottom of said condensing, condensing-demister and condensate drop-out sections. In a further aspect of the invention there are provided in the vessel above the annulus and condensate drop-out section a cold spray section and at the top of the vessel above said last section a guard chamber through which non-condensables are allowed to leave the vessel. In a still further aspect of the invention, cold condensing liquid is passed from above said annulus downwardly over and through said demister.

Flash distillation or vaporization is well known. It is known that efforts to improve flash distillation have been directed to the elimination of entrainment of unvaporized residue, which can contaminate the distillate, without losing expensively provided pressure drop at the flashing point. Also, various types of apparatus have been designed and efforts continued to improve the design of vessels and their internals to provide most economically a vessel which will not only yield improved results but which is relatively inexpensive to construct, maintain and operate.

It is well known that there are several major problems limiting yields in distillation methods and apparatus, particularly in vacuum flashing operations and apparatus. One of the major problems involves the adequate separation of liquid from the flashed vapors. Another of the problems involves the realization of minimum flash zone pressures. In the conventional horizontal or even vertical cylindrical vacuum flash towers, the flashed vapor flows a substantial distance from the flash zone to the condensing zone in a direction of flow which is normal to the vessel cross-sectional area. That is, the vapors are caused to flow axially in the vessel. The maximum quantity of total flashed vapor in the conventional vacuum flash tower is, therefore, limited by the cross-sectional area of the tower since flash zone pressure and the quantity of entrained liquid both will increase with increasing vapor velocity.

Furthermore, with a demister, such as a screen, the overall surface area of the same is limited when it is placed across the vessel by the diameter of the vessel. This works against the demister which permits the lowest pressure drop thereacross. This invention provides in the combination of its apparatus an axially disposed demister which can have an effective vapor flow area as large as required to avoid undesirable pressure drop there across. Furthermore, the invention provides a condensing spray element which causes a material and very desirable reduction in the volume of vapors before these vapors must pass through the demister thus further enhancing its operation without undesirable pressure drop there across. Thus, the specific combination of the steps of condensing and then passing condensing or condensed vapors through the demister is an especially important feature of the invention. The spraying of condensing fluid toward the demister according to the invention cools the demister, further increasing the shrinkage of vapors passing therethrough and, therefore, its efficiency.

It is an object of the present invention to provide a novel distillation apparatus or vessel. Another object of the invention is the provision of a tower design or construction which will permit the increase of the area normal to vapor flow without any increase in vessel size. A further object is to provide a demister element in a tower of a configuration such that undesired pressure drop thereacross can be avoided. A further object is the provision of a combination of a condensing section of large cross sectional area normal to vapor flow with a demister of similar size and proportion providing for increased efficiency in the use of the demister, especially in cooling the same.

Other aspects, objects and additional advantages of the present invention are apparent from this disclosure, the drawing, and the appended claims.

According to the invention there are provided a means wherein a flashed vaporized distillable material is passed in an elongated distillation zone from a flashing section at one end of the zone to an annulus surrounding a combination condensing-demisting zone substantially axially disposed in a mid-section of the distillation zone and then through said combination condensing-demisting zone, recovering unvaporized residue from said end of the zone, recovering condensate from within said condensing-demisting zone, and recovering any non-condensables from the other end of said distillation zone. Also, according to the invention, any vapors and non-condensables passing beyond the demister are passed in the other end of the zone through a guard zone or chamber wherein substantially all of any uncondensed condensables are condensed before non-condensables are exhausted from the distillation zone. As another important feature of the invention, cold condensing liquid is passed downwardly through and on the inside of said demister without having passed said liquid through said demister from the vapor condensing section inside thereof.

Figure 2:
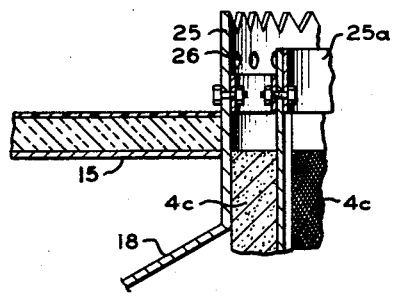

In the drawings, Figure 1 is an elevational view and cross section of an embodiment according to the invention. Figure 2 is an enlarged view of the top end of the demister-condenser element showing how liquid is supplied to the top end of the element. Figure 3 is a planned cross sectional view of the demister-condenser element taken along the lines 3—3 of Figure 1.

Referring now to Figure 1, 2 is a vessel in this specific example or embodiment 10 feet in width and 25 feet in length. The vessel comprises five sections namely, 3, 4, 5, 6, and 7 which are, respectively, a feed flashing section 3, including feed pipe 3a; a flash vapor condensing section 4, including fins 4a, sprays 4b, and demister cylinder element 4c; a condensate drop-out section 5; a cooling zone 6, including cooling spray assembly 6a; and a guard section 7, including spray assembly 7a, and baffle element 7b, disposed in guard chamber 7c having outlet 7d.

In operation, a feed of heated oil in this example 17.0 degrees A.P.I. topped crude containing 40 percent tarry matter and at a temperature of 720° F. is pumped into tower 2 through feed pipe 3a. The nozzles of the pipes are pointed downward to insure that the sprayed oil which is undergoing flashing in the lower portion of the tower, which is maintained at a pressure of 2.0 millimeters Hg absolute, will permit settling of unvaporized residue as well as substantially eliminate entrainment of the particles thereof in the vapors. Residue is drawn off through pipe 8. The vapors rise upwardly and surround flashed vapor demisting-condensing section 4 eventually passing into condensate drop-out section 5. A cool liquid spray, in this example cooled condensate, obtained from the tower 2, by way of condensate removal pipe 9 and cooled by means not shown, is passed into the tower by pipe 10. Branch pipes 11 feed substantially identical headers 12 which are interconnected by pipes 13 which surround demister element 4c and which are equipped with spray nozzles 14 along their lengths and thus provide cool spray which condenses vapors passing through the curtain of the sprays. The condensate formed and the liquid from the sprays wet the demister element 4c. This element is supplied with sufficient cool oil to keep it sufficiently cool to thus provide an extended surface area for insuring substantially complete condensing of the vapors remaining as they pass therethrough. This is explained further below.

As shown, the section 4 extends from insulated annular plate 15 to the collecting pan 16, which is provided with vertical wall section 17. There is provided at the top end of the section 4a baffle skirt or deflector cone 18. Elements 17 and 18 serve to deflect vapors into the spray curtain provided by nozzles 14. The fins 4a, with mesh 4d thereon, serve to guide the vapors uniformly into and through the spray curtain. See Figure 3.

According to the operation provided by this invention, the demister-condensing section is an improvement over the art which existed prior to the invention since temperature of the demister element can be independently regulated regardless of the amount of condensate being formed because the cooled fluid provided at 10 is independent from the condensate. Furthermore, the operation provides for completely condensing all condensables, only non-condensables being allowed to leave the tower at 7d.

Liquid spray 6a in this example is fed cooled condensate similar to that occurring at 10. The spray in section 6 serves to maintain this section at a desired low temperature, in this example 300° F. A very small portion of vapors which have not sufficiently condensed and which may enter section 6 in the form of a fine fog or mist is prevented substantially from leaving the tower at its top, and to insure that substantially no condensables are lost at the top, cold liquid spray is provided by pipe 20 at spray 7a. The cold liquid in this example is cold condensate obtained from the operation. The liquid from sprays 6a and 7a ultimately collects on 15 except for a portion which drops directly into section 5, the liquid from spray 7a collecting in pan 21 and draining into section 6 by pipe 22. In the guard chamber elements 7b in this embodiment are composed of angle irons disposed to provide a tortuous vapor path and are wetted by spray 7a.

Referring now to Figure 2, the top end of deflector zone 18 forms a weir or dam 25 which is serrated along its top edge to provide even overflow. Also, there are provided holes 26 to permit even distribution of the cool liquid passing directly through the dam. The liquid flows normally through the dam onto the top end of element 4c, supported by mesh supporting cage 25a, wetting element 4c thoroughly so that any vapor which tends to escape over the top end of the condensing curtain of spray is bound to encounter the top and substantially wetted portion of element 4c. Also, the amount of liquid which can be arranged to pass down over the demister element can be independently controlled from the amount of liquid which is sprayed through the condensing sprays. Furthermore, the temperature of the liquid passing down over the demister element can be independently controlled and, therefore, the actual physical conditions due to condensing vapors just ahead of the demister and in the demister can also be controlled.

The element 4c and its associated equipment is entirely within the limit described by a cylinder passing through the lower end of element 18 and element 17. In this embodiment, the demister-condensing section is 7 feet high and 2½ feet in diameter including two inch thickness of element 4c. This section is disposed in the tower about 6 feet above the feed pipe 3a which in turn is about 4 feet from the bottom of the tower. The guard chamber is 5 feet long and 3 feet high. Pipes are of a diameter sufficient to carry desired flow rates which in each instance are established by one skilled in the art depending upon the nature of the feedstock, its amount, the degree of vaporization desired, etc. With the foregoing information, one skilled in the art in possession of this disclosure is now able to construct and operate the invention in this specific embodiment.

The invention being essentially of a physical character it will be obvious to one skilled in the art in possession of this disclosure that he can apply it to the distillation or flash separation of various distillable liquids other than oil. For example, organic reaction masses or materials may be distilled according to the present invention and even in an apparatus such as here set forth and described. Food materials such as oranges and other fruit or vegetable juices can likewise be feeds for the invention.

Specific example

The following data are shown, representing a specific operation of this invention:

Fresh feed (Western Kansas topped crude oil) (3a):
- Barrels per day _____ 4,000
- API @ 60° F./60° F. _____ 17.0
- Temperature, ° F. _____ 720

Residuum (8):
- Barrels per day _____ 1,600
- Specific gravity _____ 1.0210
- Temperature, ° F. _____ 700
- Penetration, 77° F., 100 gms., 5 sec. _____ 100
- Ductility in cms., 5 cm./min. @ 77° F. ____ 110+

Condensate make (9):*
- Barrels per day _____ 2,400
- API @ 60° F./60° F. _____ 24.0
- Temperature, ° F. _____ 300

Condensate (10):
- Barrels per day _____ 9,000
- API @ 60° F./60° F. _____ 24.0
- Temperature, ° F. _____ 220

Condensate (6a):
- Barrels per day _____ 600
- API @ 60° F./60° F. _____ 24.0
- Temperature, ° F. _____ 220

Condensate (20):
- Barrels per day _____ 1,800
- API @ 60° F./60° F. _____ 24.0
- Temperature, ° F. _____ 140

Flash zone (3):
- Temperature, ° F. _____ 700
- Pressure, mm., Hg abs. _____ 2.0

Jet zone (7d):
- Pressure, mm. Hg abs. _____ 1.0

* This figure shows net make and does not include condensate recycle from lines 10, 6a, and 20. The final combined temperature is 300° F.

Reasonable variation and modification are possible within the scope of the foregoing disclosure, drawings, and appended claims to the invention the essence of which is that an apparatus has been provided for flash distillation of a distillable material wherein flash vapors are substantially condensed and then passed through a demister, substantially as described, the condensing-demister zones in one embodiment being substantially concentrically disposed about each other, preferably the demister zone being within the condensing zone, and the two zones being substantially axially disposed within a mid section of an elongated distillation zone so that vapors are passed from the thus formed annulus through said condensing-demister zones.

I claim:

1. A distillation apparatus comprising a substantially cylindrical vertically disposed distillation vessel, downwardly oriented distillation feed spray nozzles in the bottom section of said vessel, a residue draw-off also in the bottom of said vessel, an axially disposed substantially cylindrical condensate drop-out section extending in the mid-section of said vessel, a substantially cylindrical demister element surrounding said drop-out section and defining said drop-out section, a condensing spray assembly surrounding said element and adapted to spray a condensing spray over its entire surface, spaced partitions extending radially from said element to a point beyond said assembly, the diameter of the assembly being substantially smaller than that of the vessel so as to provide an annulus, a condensate-collecting pan provided with a condensate drawoff extending to a point outside the vessel, said pan extending across the bottoms of said partitions, assembly, element and drop-out section and being of a diameter smaller than that of the vessel and forming the lower end of said annulus, a ring-shaped plate at the upper end of said annulus forming and closing the other end thereof, the aperture in said plate being substantially coextensive with said drop-out section, a dam extending completely around said aperture at the top end of said element disposed substantially at the outer periphery of said element, a further dam concentrically disposed within said first dam and substantially at the top of the inner periphery of said element, cooling spray means in said vessel above said drop-out section adapted to spray condensing fluid into the vapors rising from said drop-out section and onto said plate, a guard chamber in the top of said vessel above said last-mentioned spray disposed substantially horizontally in the top of said vessel, said chamber communicating with the outside of the vessel at one of its ends and at its other end having spray and baffle elements to remove last traces of condensables and a pan to collect spray fluid and condensables from said chamber and to convey the same to said plate.

2. A distillation apparatus comprising a vertically disposed distillation vessel, downwardly oriented distillation feed spray nozzles in the bottom section of said vessel, a residue draw-off in the bottom of said vessel, an axially disposed condensate drop-out section extending in the mid section of said vessel, a demister element surrounding said drop-out section and defining said drop-out section, a condensing spray assembly surrounding said element and adapted to spray a condensing spray over its entire surface, the diameter of the assembly being substantially smaller than that of the vessel so as to provide an annulus, a condensate-collecting pan provided with a condensate draw-off extending to a point outside the vessel, said pan extending across the bottoms of said assembly, element and drop-out section and being of a diameter smaller than that of the vessel and forming the lower end of said annulus, a ring-shaped plate at the upper end of said annulus forming and closing the other end thereof, the aperture in said plate being substantially coextensive with said drop-out section, a guard chamber in the top of said vessel, said chamber communicating with the outside of the vessel at one of its ends and at its other end with the inside of said vessel.

3. A distillation apparatus comprising a vertically disposed distillation vessel, downwardly oriented distillation feed spray nozzles in the bottom section of said vessel, a residue draw-off in the bottom of said vessel, an axially disposed condensate drop-out section extending in the mid section of said vessel, a demister element surrounding said drop-out section and defining said drop-out section, a condensing spray assembly surrounding said element and adapted to spray a condensing spray over its entire surface, the diameter of the assembly being substantially smaller than that of the vessel so as to provide an annulus, a condensate-collecting pan provided with a condensate draw-off extending to a point outside the vessel, said pan extending across the bottoms of said assembly, element and drop-out section and being of a diameter smaller than that of the vessel and forming the lower end of said annulus, a ring-shaped plate at the upper end of said annulus forming and closing the other end thereof, the aperture in said plate being substantially coextensive with said drop-out section, cooling spray means in said vessel above said drop-out section adapted to spray condensing fluid into the vapors rising from said drop-out section and onto said plate, a guard chamber in the top of said vessel above said last-mentioned spray, said chamber communicating with the outside of the vessel at one of its ends and at its other end with the inside of said vessel.

4. A distillation apparatus comprising a vertically disposed distillation vessel, downwardly oriented distillation feed spray nozzles in the bottom section of said vessel, a residue draw-off in the bottom of said vessel, an axially disposed condensate drop-out section extending in the mid section of said vessel, a demister element surrounding said drop-out section and defining said drop-out section, a condensing spray assembly surrounding said element and adapted to spray a condensing spray over its entire surface, the diameter of the assembly being substantially smaller than that of the vessel so as to provide an annulus, a condensate-collecting pan provided with a condensate draw-off extending to a point outside the vessel, said pan extending across the bottoms of said partitions, assembly, element and drop-out section and being of a diameter smaller than that of the vessel and forming the lower end of said annulus, a ring-shaped plate at the upper end of said annulus forming and closing the other end thereof, the aperture in said plate being substantially coextensive with said drop-out section, a dam extending completely around said aperture at the top end of said element disposed substantially at the outer periphery of said element, cooling spray means in said vessel above said drop-out section adapted to spray condensing fluid into the vapors rising from said drop-out section and onto said plate, a guard chamber in the top of said vessel above said last-mentioned spray, said chamber communicating with the outside of the vessel at one of its ends and at its other end in the inside of the vessel, and to exhaust non-condensables from said vessel.

5. A distillation apparatus comprising a vertically disposed distillation vessel, downwardly oriented distillation feed spray nozzles in the bottom section of said vessel, a residue draw-off in the bottom of said vessel, an axially disposed condensate drop-out section extending in the mid section of said vessel, demister element surrounding said drop-out section and defining said drop-out section, a condensing spray assembly surrounding said element and adapted to spray a condensing spray over its entire surface, the diameter of the assembly being substantially smaller than that of the vessel so as to provide an annulus, a condensate-collecting pan provided with a condensate draw-off extending to a point outside the vessel, said pan extending across the bottoms of said assembly, element and drop-out section and being of a diameter smaller than that of the vessel and forming the lower end of said annulus, a ring-shaped plate at the upper end of said annulus forming and closing the other end thereof, the aperture in said plate being substantially coextensive with said drop-out section, a guard chamber in the top of said vessel above said last-mentioned spray disposed substantially horizontally in the top of said vessel, said chamber communicating with the outside of the vessel at one of its ends and at its other end having spray and baffle elements to remove last traces of condensables and a pan to collect spray fluid and condensables from said chamber and to convey the same to said plate.

6. In a distillation vessel an axially disposed condensate drop-out section extending in the mid section of said vessel, a demister element surrounding said drop-out section and defining said drop-out section, a condensing spray assembly surrounding said element and adapted to spray a condensing spray over its entire surface, the diameter of the assembly being substantially smaller than that of the vessel so as to provide an annulus, a condensate-collecting pan provided with a condensate draw-off extending to a point outside the vessel, said pan extending across the bottoms of said partitions, assembly, element and drop-out section and being of a diameter smaller than that of the vessel and forming the lower end of said annulus, a ring-shaped plate at the upper end of said annulus forming the other end thereof, the aperture in said plate being substantially coextensive with said drop-out section, and means for flash vaporizing a distillable material below said pan providing vapors which pass into said annulus and means for withdrawing unvaporized residue from said vessel.

7. In a distillation vessel an axially diposed condensate drop-out section extending in the mid section of said vessel, a demister element surrounding said drop-out section and defining said drop-out section, a condensing spray assembly surrounding said element and adapted to spray a condensing spray over its entire surface, spaced partitions extending radially from said element to a point beyond said assembly, the diameter of the assembly being substantially smaller than that of the vessel so as to provide an annulus, a condensate-collecting pan provided with a condensate draw-off extending to a point outside the vessel, said pan extending across the bottoms of said partitions, assembly, element and drop-out section and being of a diameter smaller than that of the vessel and forming the lower end of said annulus, a ring-shaped plate at the upper end of said annulus forming the other end thereof, the aperture in said plate being substantially coextensive with said drop-out section, and means for flash vaporizing a distillable material below said pan providing vapors which pass into said annulus and means for withdrawing unvaporized residue from said vessel.

8. In a distillation vessel an axially disposed condensate drop-out section extending in the mid section of said vessel, a demister element surrounding said drop-out section and defining said drop-out section, a condensing spray assembly surrounding said element and adapted to spray a condensing spray over its entire surface, spaced partitions extending radially from said element to a point beyond said assembly, the diameter of the assembly being substantially smaller than that of the vessel so as to provide an annulus, a condensate-collecting pan provided with a condensate draw-off extending to a point outside the vessel, said pan extending across the bottoms of said partitions, assembly, element and drop-out section and being of a diameter smaller than that of the vessel and forming the lower end of said annulus, a ring-shaped plate at the upper end of said annulus forming the other end thereof, the aperture in said plate being substantially coextensive with said drop-out section, a dam extending completely around said aperture at the top end of said element disposed substantially at the outer periphery of said element, and means for flash vaporizing a distillable material below said pan providing vapors which pass into said annulus and means for withdrawing unvaporized residue from said vessel.

9. In a distillation vessel an axially disposed condensate drop-out section extending in the mid-section of said vessel, a demister element surrounding said drop-out section and defining said drop-out section, a condensing spray assembly surrounding said element and adapted to spray a condensing spray over its entire surface, spaced partitions extending radially from said element to a point beyond said assembly, the diameter of the assembly being substantially smaller than that of the vessel so as to provide an annulus, a condensate-collecting pan provided with a condensate draw-off extending to a point outside the vessel, said pan extending across the bottoms of said partitions assembly, element and drop-out section and being of a diameter smaller than that of the vessel and forming the lower end of said annulus, a ring-shaped plate at the upper end of said annulus forming the other end thereof, the aperture in said plate being substantially coextensive with said drop-out section, a dam extending completely around said aperture at the top end of said element disposed substantially at the outer periphery of said element, a further dam concentrically disposed within said first dam disposed substantially at the inner periphery of said element and means for flash vaporizing a distillable material below said pan providing vapors which pass into said annulus and means for withdrawing unvaporized residue from said vessel.

10. Apparatus for distilling a distillable material comprising an elongated distilling vessel, said distilling vessel comprising a substantially axially disposed elognated condensing means extending through a mid-section of said vessel providing an annulus in said mid section of said distilling means, means in said vessel coacting with the same and the condensing means to cause vapors in said annulus to flow into said condensing means, a demister screen means disposed within said condensing means and being substantially coextensive therewith, means for feeding distilland to said distilling means and providing vapors in said annulus, means for removing condensate from within said condensing and demister means, means for recovering non-condensibles from within said demister screen means, and means for removing non-vaporized distilland from said distilling means.

11. A means for distilling a distillable material which comprises the following means within a flash distilling vessel, a distilland flashing means, a vapor demisting means disposed in said flash distillation means above said flashing means, a vapor condensing means disposed above said flashing means and surrounding said demisting means, a condensate drop-out section disposed axially within said demisting means, a residue withdrawing means, a condensate collecting means for collecting condensate, formed in said vapor condensing means and dropped out in said condensate drop-out section and in said demisting means and means for removing non-condensed vapor from within said demisting means.

12. A means according to claim 11 wherein the distillation means is substantially cylindrical, the flashing means is at one end of the distillation means, the vapor condensing means, vapor demisting means and condensate drop-out section are axially disposed in a mid section of the distillation means and wherein uncondensed vapor removal means are provided at the other end of the distillation means.

13. An apparatus according to claim 12 wherein the vapor condensing means comprises a condensing spray means and the spray is directed toward the demister means.

14. An apparatus according to claim 13 wherein a cool spray means is provided above said condensate drop-out section to supply a cool spray above said condensate drop-out section to prevent escape of residual mist or fog from said other end of the distillation means.

References Cited in the file of this patent

UNITED STATES PATENTS

| | | |
|---|---|---|
| 235,521 | Fox | Dec. 14, 1880 |
| 888,119 | Richards | May 19, 1908 |
| 1,407,380 | Chenard | Feb. 21, 1922 |
| 2,760,918 | Barr | Aug. 28, 1956 |
| 2,793,174 | Smith | May 21, 1957 |